(12) United States Patent
Murakoshi et al.

(10) Patent No.: US 10,252,704 B2
(45) Date of Patent: Apr. 9, 2019

(54) VEHICLE REVERSE ASSISTANT

(71) Applicant: SUBARU CORPORATION, Tokyo (JP)

(72) Inventors: Masayuki Murakoshi, Tokyo (JP); Keiko Kabe, Tokyo (JP); Kanto Itabashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 79 days.

(21) Appl. No.: 15/483,878

(22) Filed: Apr. 10, 2017

(65) Prior Publication Data

US 2017/0334413 A1 Nov. 23, 2017

(30) Foreign Application Priority Data

May 23, 2016 (JP) ................... 2016-102295

(51) Int. Cl.
*B60T 7/22* (2006.01)
*B60R 1/00* (2006.01)
(Continued)

(52) U.S. Cl.
CPC .................. *B60T 7/22* (2013.01); *B60R 1/00* (2013.01); *B60T 8/1708* (2013.01);
(Continued)

(58) Field of Classification Search
CPC ...... B60T 7/22; B60T 8/1708; B60T 2230/08; B60R 1/00; B60R 2300/80; B60R 2300/8093; B62D 15/0285
See application file for complete search history.

(56) References Cited

U.S. PATENT DOCUMENTS

| 6,446,998 B1 * | 9/2002 | Koenig | ..................... B60D 1/30 180/169 |
| 2002/0017412 A1 * | 2/2002 | Pietsch | .............. B60K 31/0008 180/169 |

(Continued)

FOREIGN PATENT DOCUMENTS

| JP | 2000-135957 A | 5/2000 |
| JP | 2000-211559 A | 8/2000 |

(Continued)

OTHER PUBLICATIONS

Japanese Office Action dated Apr. 3, 2018 in Japanese Application No. 2016-102295 with an English translation thereof.

(Continued)

*Primary Examiner* — Courtney D Heinle
(74) *Attorney, Agent, or Firm* — McGinn IP Law Group, PLLC (57) ABSTRACT

A vehicle reverse assistant includes a rear side sensor, a towed object detector, and a stop determination threshold distance setter. The rear side sensor is provided at a rear portion of an own vehicle. The rear side sensor senses a rear side sensing region. The towed object detector detects whether a towed object is connected to the rear portion of the own vehicle. The stop determination threshold distance setter sets one end of a stop determination threshold distance at a position spaced apart at a constant distance from a rear end of the towed object on a basis of a sensing signal supplied from the rear side sensor when the towed object detector detects connection of the towed object.

17 Claims, 7 Drawing Sheets

(51) Int. Cl.
*B60T 8/17* (2006.01)
*B62D 15/02* (2006.01)

(52) U.S. Cl.
CPC ...... *B62D 15/0285* (2013.01); *B60R 2300/80* (2013.01); *B60R 2300/8093* (2013.01); *B60T 2230/08* (2013.01)

(56) References Cited

U.S. PATENT DOCUMENTS

| | | | | |
|---|---|---|---|---|
| 2006/0155469 | A1* | 7/2006 | Kawasaki | B60R 21/013 701/301 |
| 2014/0085472 | A1* | 3/2014 | Lu | B60R 1/002 348/148 |
| 2014/0218506 | A1* | 8/2014 | Trombley | B60R 1/003 348/113 |
| 2014/0218522 | A1* | 8/2014 | Lavoie | G08G 1/0962 348/148 |
| 2014/0222288 | A1* | 8/2014 | Lavoie | G06F 17/00 701/41 |
| 2014/0267688 | A1* | 9/2014 | Aich | H04N 7/181 348/113 |
| 2014/0297128 | A1* | 10/2014 | Lavoie | G01B 21/06 701/41 |
| 2015/0307129 | A1* | 10/2015 | Headley | B60D 1/245 701/41 |
| 2016/0039456 | A1* | 2/2016 | Lavoie | B62D 15/027 701/41 |
| 2016/0119539 | A1* | 4/2016 | Tan | B60R 1/00 348/148 |
| 2017/0101089 | A1* | 4/2017 | Bales | B60W 30/06 |

FOREIGN PATENT DOCUMENTS

| | | |
|---|---|---|
| JP | 2005-031967 A | 2/2005 |
| JP | 2006-256544 A | 9/2006 |
| JP | 2016-016829 A | 2/2016 |

OTHER PUBLICATIONS

JPO Decision to Grant a Patent dated Jun. 5, 2018 in Japanese Application No. 2016-102295, with a machine English translation.

* cited by examiner

VEHICLE REVERSE ASSISTANT

CROSS REFERENCE TO RELATED APPLICATIONS

The present application claims priority from Japanese Patent Application No. 2016-102295 filed on May 23, 2016, the entire contents of which are hereby incorporated by reference.

BACKGROUND

The technology relates to a vehicle reverse assistant that detects a rear end of a towed object and a rear obstacle on the basis of information from a rear side sensor to avoid collision with the obstacle, when an own vehicle reverses while towing the towed object.

A drive assistant has been known which detects vehicles traveling in adjacent lanes and traveling behind an own vehicle using a rear side sensor such as a millimeter wave radar mounted on the traveling own vehicle to inform a driver about the vehicles approaching the own vehicle.

For example, Japanese Unexamined Patent Application Publication (JP-A) No. 2016-16829 discloses, as the drive assistant of this kind, a technique of informing and alerting a driver of an own vehicle, for example, about vehicles traveling alongside the own vehicle, at a blind spot region that is difficult to be visually confirmed by the driver, or about vehicles in proximity within left and right lanes adjacent to the own vehicle when detecting such vehicles. The technique allows other vehicles to be detected on the basis of data scanned by both rear side sensors provided respectively at left and right sides of a rear bumper.

In addition, when the driver intends to set a select lever to a reverse (R) range to reverse the own vehicle, a monitor provided in, for example, a car navigation system displays an image captured by a rearview camera. The driver confirms the image behind the own vehicle displayed in the monitor while reversing the own vehicle. During this time, the rear side sensor continuously monitors whether there is an obstacle in proximity to rear sides of the own vehicle, and alerts the driver with a warning when detecting the obstacle in proximity to the own vehicle.

SUMMARY

When an own vehicle tows a towed object such as a trailer, rear side sensors are designed to stop operation (to be turned OFF), because the rear side sensors do not function properly as a result of interruption of radar radio waves transmitted by the rear side sensors, causing a system error. In addition, the monitor displays only a captured image of a front portion of the towed object, thus making it difficult to obtain information on the rear of the own vehicle from the monitor. As a result, it becomes difficult for a driver, during reverse traveling, to visually grasp a distance from the towed object to the obstacle present behind the towed object, which may lower convenience of the driver.

As a countermeasure, JP-A No. 2006-256544, for example, discloses providing a sensor such as a camera at a rear portion of the towed object to obtain information on the rear with this sensor. This makes it possible for the driver, during reverse traveling, to easily grasp whether there is an obstacle in proximity to the rear of the own vehicle by confirming an image that is transmitted from the sensor and is displayed on the monitor.

However, the above-described technique disclosed in JP-A No. 2006-256544 is inapplicable when the towed object is not provided with the sensor such as a camera.

In contrast, when the driver intends to reverse the own vehicle while towing the towed object, it is necessary for the driver to give extreme care in order to avoid a contact with an obstacle adjacent to the towed object, as steering operations differ significantly from those in a case where the driver reverses only the own vehicle. Nevertheless, connecting the towed object to the own vehicle makes it difficult for the driver to visually confirm the rear, thus doubly increasing driver's burden.

It is desirable to provide a vehicle reverse assistant that enables detection of a rear obstacle for informing the driver about the obstacle to thereby alleviate the driver's burden, in reversing the towed object connected to the own vehicle even when the towed object is not provided with a sensor that detects the rear.

An aspect of the technology provides a vehicle reverse assistant. The vehicle reverse assistant includes a rear side sensor, a towed object detector, and a stop determination threshold distance setter. The rear side sensor is provided at a rear portion of an own vehicle. The rear side sensor senses a rear side sensing region. The towed object detector detects whether a towed object is connected to the rear portion of the own vehicle. The stop determination threshold distance setter sets one end of a stop determination threshold distance at a position spaced apart at a constant distance from a rear end of the towed object on a basis of a sensing signal supplied from the rear side sensor when the towed object detector detects connection of the towed object.

DETAILED DESCRIPTION

Figure 1A:
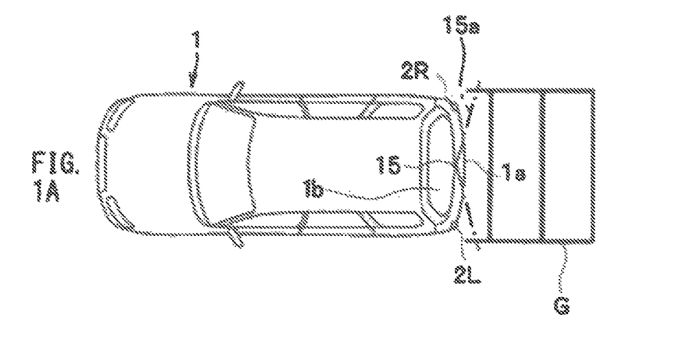
FIG. 1A is a plan view of an own vehicle.
Figure 1B:
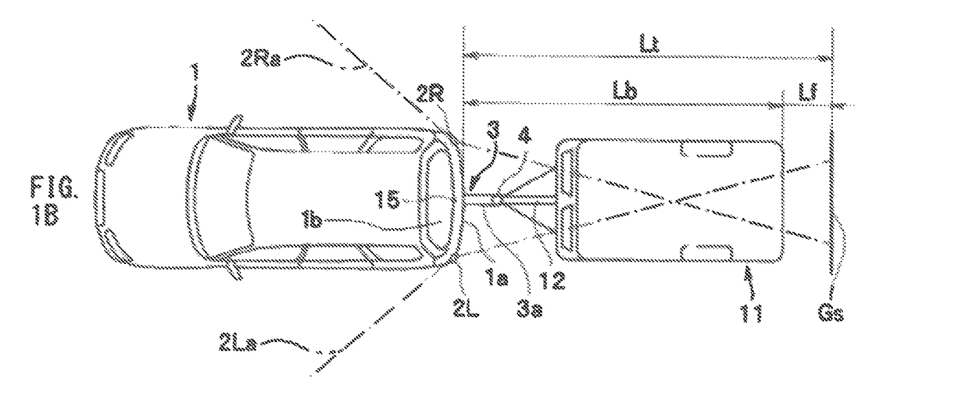
FIG. 1B is a plan view of a state where a towed object is connected to the own vehicle.
Figure 1C:
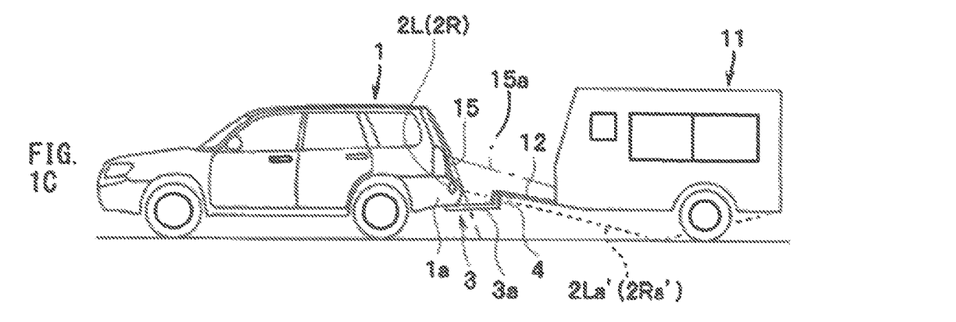
FIG. 1C is a side view of the state illustrated in FIG. 1B.

Description is given below, with reference to the accompanying drawings, of some implementations of the technology. As illustrated in FIG. 1, an own vehicle 1 that is a towing vehicle may be provided with a rear bumper 1a at a rear portion of the own vehicle 1, and left rear side radar 2L and right rear side radar 2R may be provided, respectively, at a left side portion and at a right side portion of the rear bumper 1a. In one implementation of the technology, the left rear side radar 2L and the right rear side radar 2R may each serve as a specific example of "rear side sensor". It is to be noted that known examples of each of the left rear side radar 2L and the right rear side radar 2R may include a millimeter wave radar, a microwave radar, and an infrared laser radar.

Scan regions 2La and 2Ra that are, respectively, rear side sensing regions of the left rear side radar 2L and the right rear side radar 2R may be preset. The scan regions 2La and 2Ra may be relatively large in a horizontal direction, and may be set to cover respective regions from the rear to left and right sides of the own vehicle 1. In addition, a lower portion of the scan regions 2La and 2Ra in a vertical direction may be set to allow a road surface to be irradiated by radar waves immediately behind the own vehicle 1. The radar waves incident on the road surface are reflected toward the rear of the own vehicle 1.

Further, a rearview camera 15 may be attached to a rear gate 1b provided at an upper portion of the rear bumper 1a. The rearview camera 15 may be provided near an upper portion of a license plate, and may be activated when the driver sets a select lever at an R range. The rearview camera 15 may capture an image of the rear of the own vehicle 1 in such a state as to include a rear end edge of the rear bumper 1a. A capturing area of the rearview camera 15 may be an area indicated by a reference numeral 15a in the drawings. An image captured by the rearview camera 15 may be displayed on a monitor provided in, for example, a car navigation system to allow the driver to reverse the own vehicle 1 while visually confirming the rear image displayed on the monitor.

Further, a synthesized image with a stop guide virtual line G being superimposed on the rear image may be displayed on the monitor. The stop guide virtual line G may be displayed to make it easier to grasp a relative position of the own vehicle 1 with respect to the rear. It is to be noted that FIG. 1A illustrates a concept of the stop guide virtual line G displayed on the monitor in a bird's eye view.

A reverse assistant controller 21 described later may detect whether a towed object 11 such as a trailer is connected to the rear portion of the own vehicle 1 on the basis of data (scan data) in a distance direction as well as in the vertical direction scanned by the left rear side radar 2L and the right rear side radar 2R.

A hitch connection bar 12 that extends forward may be fixed to the middle in a vehicle-width direction of a front portion of the towed object 11. A hitch coupler may be fixed to the tip of the hitch connection bar 12. Meanwhile, a hitch member 3 may be fixed to an unillustrated rear frame that supports the rear bumper 1a of the own vehicle 1. A hitch arm 3a may extend rearward from the middle in a vehicle-width direction of the hitch member 3. A hitch ball may be fixed to a rear end portion of the hitch arm 3a, and the hitch coupler may be connected with the hitch ball. The towed object 11 may be so towed as to follow the traveling of the own vehicle 1 via the hitch connection bar 12 and the hitch member 3 that are connected to each other. It is to be noted that description is given below in which a portion where the hitch ball and the hitch coupler are connected is referred to collectively as a connector 4 for convenience.

Figure 2:
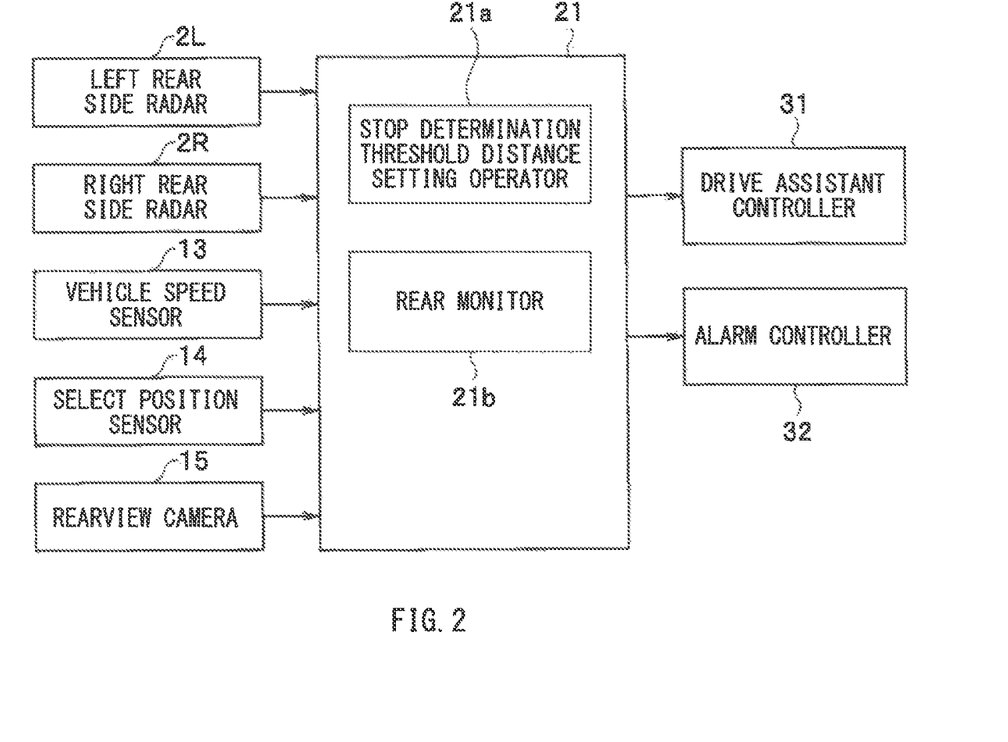
FIG. 2 is a schematic configuration diagram of a reverse assistant.

As illustrated in FIG. 2, the left rear side radar 2L and the right rear side radar 2R may be each coupled to the reverse assistant controller 21. Further, a vehicle speed sensor 13, a select positon sensor 14, and a rearview camera 15 may be coupled to the reverse assistant controller 21. The vehicle speed sensor 13 may detect a speed of the own vehicle 1 (own vehicle speed) Vs. The select position sensor 14 may detect a set positon of the select lever. In one implementation, the select positon sensor 14 may serve as a specific example of "select position detector". Meanwhile, a drive assistant controller 31 and an alarm controller 32 may be each coupled to output side of the reverse assistant controller 21.

The drive assistant controller 31 may perform a collision avoidance control by control intervention irrespective of an intention of the driver, and may include various controllers such as an automatic brake controller, an automatic vehicle speed controller, and an automatic steering controller. In one implementation of the technology, the automatic brake controller may serve as a specific example of an "automatic brake controller". In addition, the alarm controller 32 may actuate a warning unit such as a speaker, a buzzer, and a warning lamp with a command signal supplied from the reverse assistant controller 21 to emit a warning sound to the driver.

The reverse assistant controller 21 may be mainly configured by a microcomputer, and may include, for example, a central processing unit (CPU), a read-only memory (ROM), a random-access memory (RAM), and a non-volatile memory which are well known. The ROM may store, for example, various programs to be executed by the CPU, and fixed data typified by a map.

The left rear side radar 2L and the right rear side radar 2R may each include a transmitting circuit, a receiving circuit, an antenna that transmits and receives radar radio waves, a scanning mechanism, and a reception processor. The reception processor may perform A/D conversion on a received sensing signal to transmit the sensing signal having undergone the A/D conversion to the reverse assistant controller 21. Further, the rearview camera 15 may contain an image sensor such as a charge-coupled device (CCD) and a complementary metal-oxide semiconductor (CMOS). The rearview camera 15 may perform A/D conversion on an analog image captured by the image sensor, and thereafter may transmit to the reverse assistant controller 21 an image (sensing signal) obtained by performing a predetermined image processing on the analog image having undergone the A/D conversion.

The reverse assistant controller 21 may analyze a frequency of the above-described sensing signal in a digital signal processor (DSP) circuit to generate scan data as sensing data indicating a relative relationship (such as distance and angle) between the own vehicle 1 and rear obstacles outside the own vehicle 1 (such as a wall surface and another vehicle).

The reverse assistant controller 21 may include a stop determination threshold distance setting operator 21a and a rear monitor 21b as functions that execute an assistant control in reversing the own vehicle 1 connected to the towed object 11.

The stop determination threshold distance setting operator 21a may determine whether the towed object 11 is connected to the own vehicle 1 on the basis of the scan data supplied from the left rear side radar 2L and the right rear side radar 2R, and may set a stop determination threshold distance during towing Lt with the total length of the towed object 11 being considered, when the stop determination threshold distance setting operator 21a determines that the towed object 11 is connected to the own vehicle 1.

The rear monitor 21b may set a stop guide virtual line Gs and a premonitory guide virtual line Gn on the basis of the stop determination threshold distance during towing Lt set by the stop determination threshold distance setting operator 21a, when the select lever is set at the R range. The stop guide virtual line Gs may be set parallel to the rear end of the towed object 11. The premonitory guide virtual line Gn may be set at a position spaced apart rearward at a predetermined distance from the stop guide virtual line Gs. The warning sound may be emitted when the stop guide virtual line Gs and the premonitory guide virtual line Gn are brought into proximity to an obstacle 17 behind the towed object 11.

Figure 3:
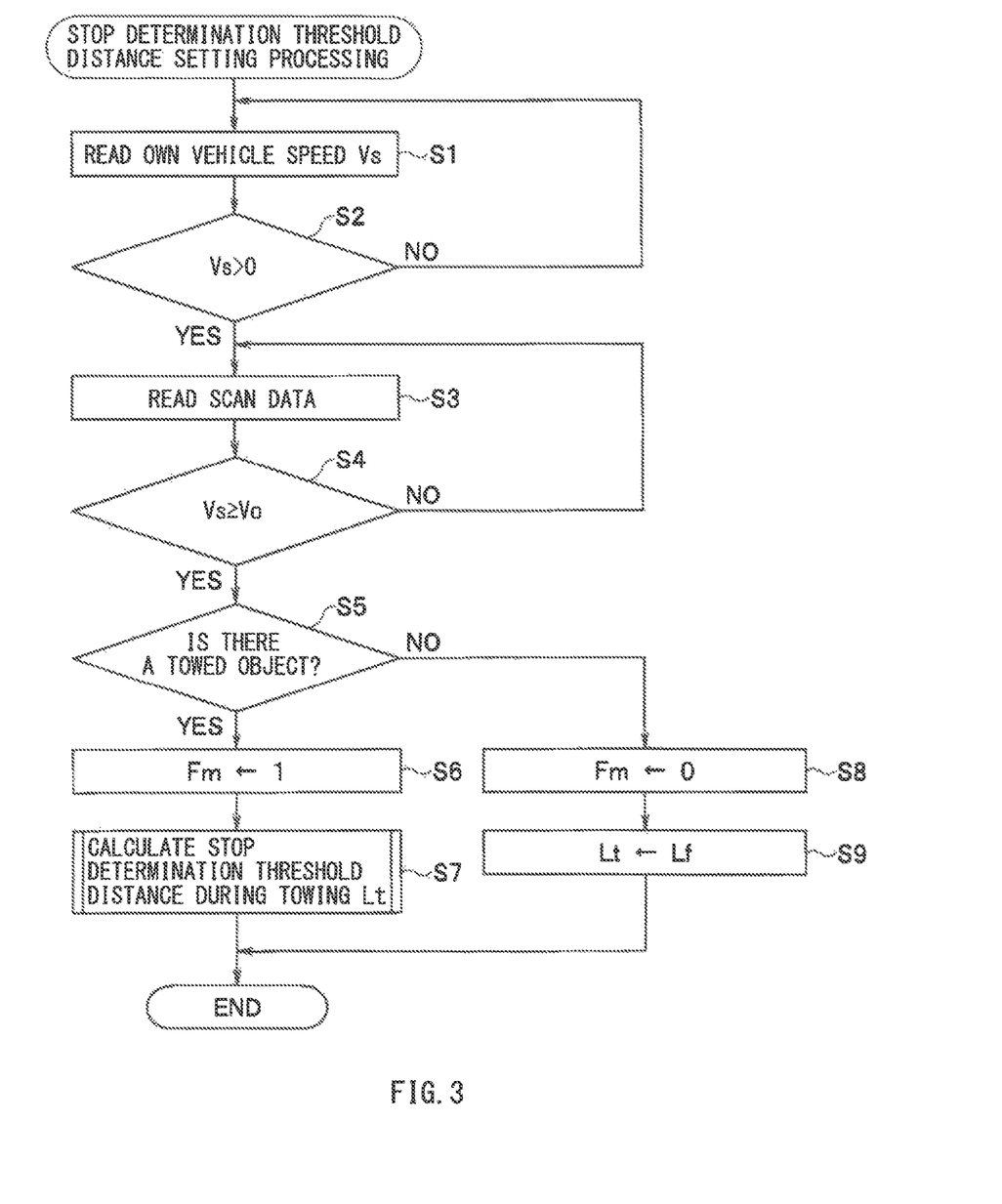
FIG. 3 is a flowchart of a stop determination threshold distance setting processing routine.

More specifically, the setting of the stop determination threshold distance during towing Lt executed by the stop determination threshold distance setting operator 21a may be processed in accordance with a stop determination threshold distance setting processing routine illustrated in FIG. 3. Further, a rear monitoring processing to be executed by the rear monitor 21b may be processed in accordance with a rear monitoring processing routine illustrated in FIGS. 4 and 5.

The stop determination threshold distance setting processing routine illustrated in FIG. 3 may be activated when the own vehicle 1 is stopped. First, in step S1, the own vehicle speed Vs detected by the vehicle speed sensor 13 may be read, and the flow may stand by in step S2 until the own vehicle 1 is started. When the start of the own vehicle 1 is detected (Vs>0), the flow may proceed to step S3, in which the scan data supplied from the left rear side radar 2L and the right rear side radar 2R may be read.

Thereafter, the flow may proceed to step S4, in which it may be checked whether the own vehicle speed Vs reaches a set vehicle speed Vo (e.g., 10 km/h). When the own vehicle speed Vs does not reach the set vehicle speed Vo (Vs<Vo), the flow may return to step S3, in which scan data reading that is a sensing operation may be continued. In contrast, when the own vehicle speed Vs reaches the set vehicle speed Vo (Vs≥Vo), the flow may proceed to step S5. In this case, the monitor provided on an instrument panel, for example, may display to the effect that data on the towed object 11 is being obtained. In addition, a speaker may also be used to inform to that effect with a voice at the time of the display. It is to be noted that a determination period from the start of the own vehicle 1 until elapse of a set time To (e.g., 3 to 5 seconds) may also be set instead of adopting the own vehicle speed Vs for the processing in step S4.

In step S5, detection may be made as to whether there is an object that follows the own vehicle 1 while keeping a substantially constant distance with respect to the own vehicle 1 on the basis of scan data read during the time from the start of the own vehicle 1 until the own vehicle speed Vs reaches the set vehicle speed Vo (alternatively, from the start of the own vehicle 1 until the elapse of the set time To). When the object is detected that follows the own vehicle 1 while keeping the substantially constant distance, it may be determined that the towed object 11 is connected to the own vehicle 1, and the flow may proceed to step S6. In step S6, a towed object determination flag Fm may be set (Fm←1), and the flow may proceed to step S7. It is to be noted that the processing in step S5 may correspond to a specific example of processing executed by a "towed object detector" in one implementation of the technology.

In contrast, when no object is detected that follows the own vehicle 1 while keeping the substantially constant distance, the flow may diverge to step S8, in which the towed object determination flag Fm may be cleared (Fm←0), and the flow may proceed to step S9. In step S9, a stop determination threshold distance Lf may be substituted for the stop determination threshold distance during towing Lt described later (Lt←Lf), and a stop guide line may be set at a position that is substantially away, by the distance Lf, from the rear end of the rear bumper 1a of the own vehicle 1 to terminate the routine.

Figure 6A:
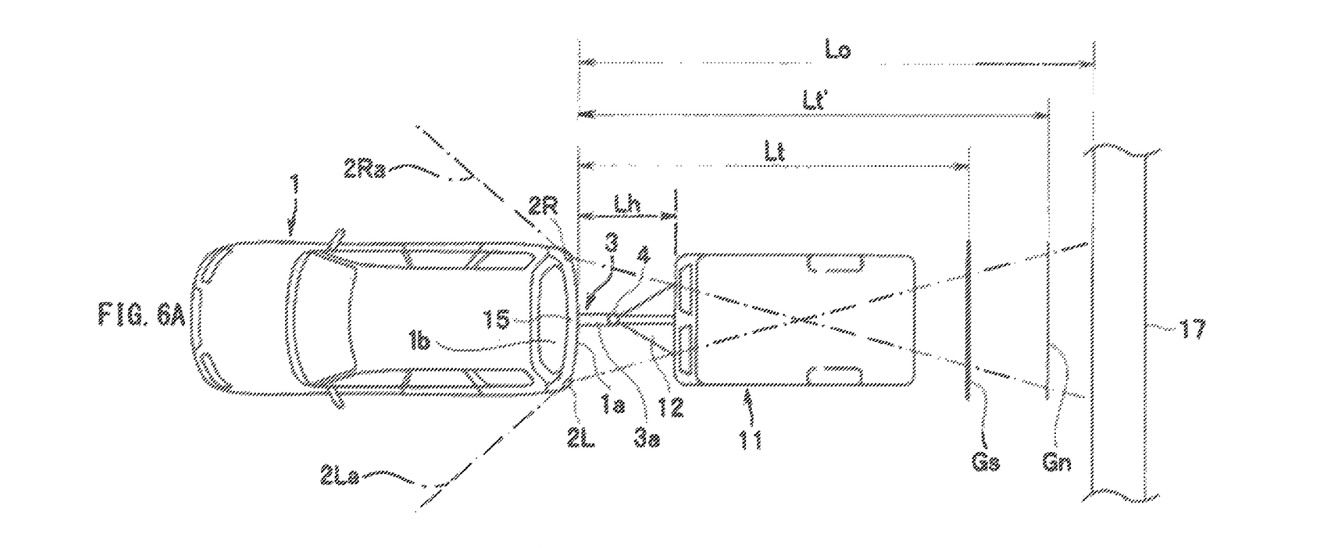
FIG. 6A is a plan view of a state where the own vehicle is parked while the towed object is connected to the own vehicle.

When the flow proceeds from step S6 to step S7, the stop determination threshold distance during towing Lt may be calculated. As illustrated in FIG. 1B, the stop determination threshold distance during towing Lt may be the sum of a total towing distance Lb and the stop determination threshold distance Lf (Lt=Lb+Lf). The total towing distance Lb is a distance from the rear end of the own vehicle 1 to the rear end of the towed object 11. A position at which one end of the stop determination threshold distance Lf reaches the obstacle 17 such as a wall surface (see FIG. 6) may be set as a stop position for the rear end of the towed object 11.

The stop determination threshold distance Lf may be a preset value, while the total towing distance Lb may be determined on the basis of the scan data read in step S3 in the present implementation. In other words, the total towing distance Lb may be determined by receiving reflected waves of the radar radio waves 2La' and 2Ra'. The radar radio waves 2La' and 2Ra' of the respective left rear side radar 2L and right rear side radar 2R are reflected by the road surface, and are incident on the rear end edge of the towed object 11 as illustrated in FIG. 1C. Alternatively, the total towing distance Lb may be stored in advance as fixed data in a memory of the reverse assistant controller 21, because the total towing distance Lb is substantially a fixed value.

Thereafter, the determined stop determination threshold distance during towing Lt may be stored in the memory of the reverse assistant controller 21 to terminate the routine. Therefore, this step S7 may include a specific example of a function that executes a "stop determination threshold distance setter" in one implementation of the technology.

Figure 4:
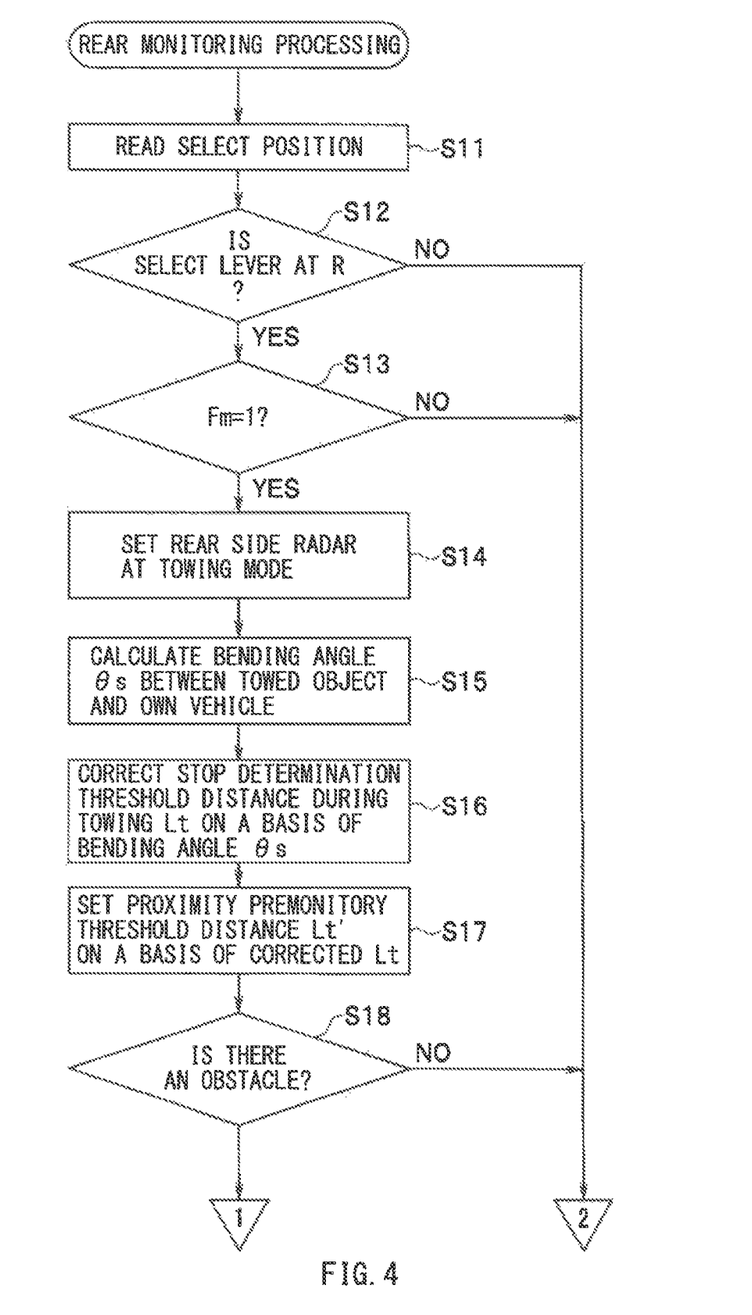
FIG. 4 is a flowchart of a rear monitoring processing routine (part 1).
Figure 5:
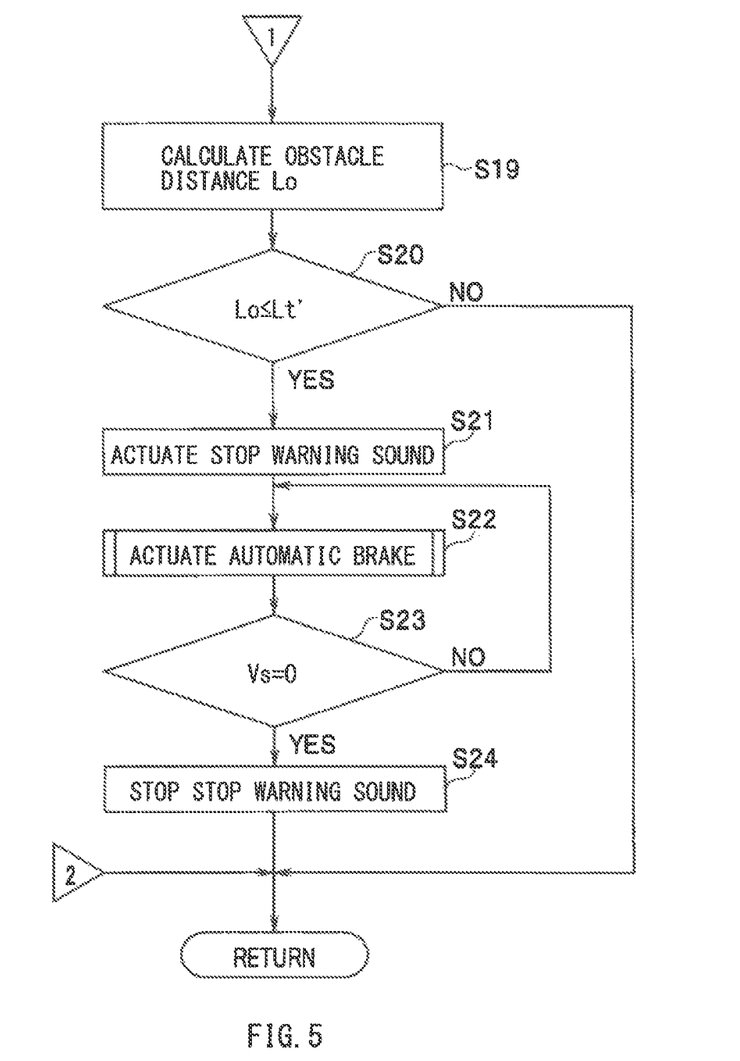
FIG. 5 is a flowchart of a rear monitoring processing routine (part 2).

The stop determination threshold distance during towing Lt may be read when the rear monitor 21b executes the rear monitoring processing routine illustrated in FIGS. 4 and 5. This routine may be executed for each set operation cycle after activation of the reverse assistant controller 21. First, in step S11, a set position of the select lever detected by the select position sensor 14 may be read.

Thereafter, in step S12, it may be checked whether the select lever is set at the R range, and the flow may stand by until the select lever is set at the R range. When it is detected that the select lever is set at the R range, the flow may proceed to step S13. In step S13, a reference may be made to a value of the towed object determination flag Fm that is set by the above-described stop determination threshold distance setting processing routine. In the case of Fm=1 where the towed object 11 is connected to the own vehicle 1, the flow may proceed to step S14. In the case of Fm=0 where the towed object 11 is not connected to the own vehicle 1, the flow may exit the routine.

When the flow proceeds to step S14 upon determination that the towed object 11 is connected to the own vehicle 1, each of the left rear side radar 2L and the right rear side radar 2R may be set at a towing mode. When the left rear side radar 2L and the right rear side radar 2R are each set at the towing mode, the reverse assistant controller 21 may receive the reflected waves of the radar radio waves 2La' and 2Ra' reflected rearward from the road surface below the towed object 11 on the basis of the scan data supplied from the left rear side radar 2L and the right rear side radar 2R. Thereafter, it may be detected whether there is an obstacle such as a wall behind the towed object 11 and another parked vehicle on the basis of the reflected waves.

Figure 7:
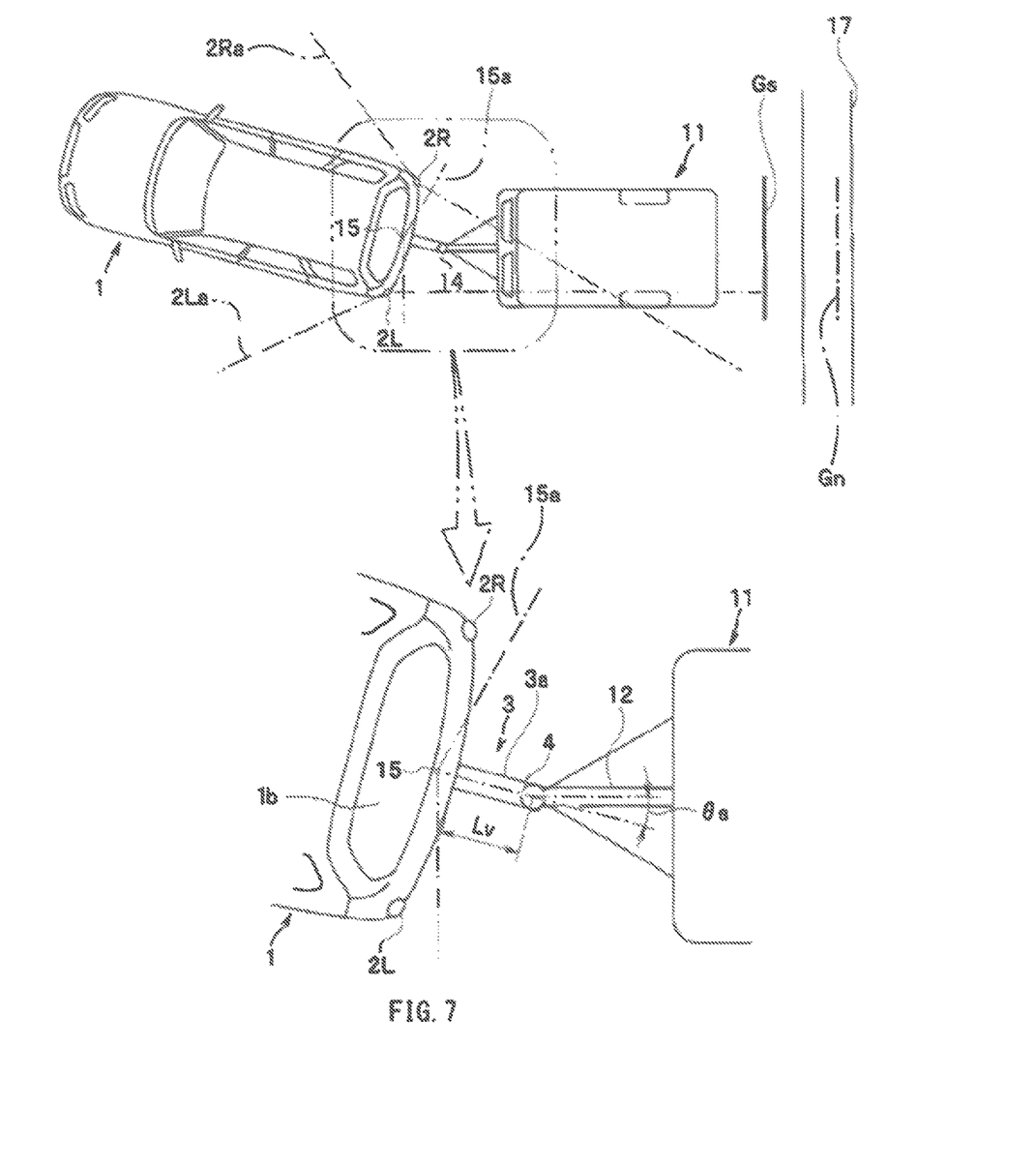
FIG. 7 is a plan view of a state where the own vehicle is parked with a bending angle formed by the own vehicle and the towed object.

Thereafter, the flow may proceed to step S15, in which a bending angle θs between the towed object 11 and the own vehicle 1 may be calculated. As illustrated in FIG. 7, when the own vehicle 1 is intended to be parked by reversing while towing the towed object 11, several K-turns may be necessary. Every time a K-turn is performed, the own vehicle 1 and the towed object 11 may be bent to each other around the connector 4, and the bending angle (connection angle) θs may be generated between the own vehicle 1 and the towed object 11 around the connector 4.

It is necessary that one end of the stop determination threshold distance during towing Lt may be set behind the towed object 11. Accordingly, when the bending angle θs is generated, the stop determination threshold distance during towing Lt may be set behind the towed object 11 by correcting the stop determination threshold distance during towing Lt on the basis of the bending angle θs.

In the present implementation, to obtain the bending angle θs, the connector 4, the hitch arm 3a, and the hitch connection bar 12 may be first determined by a method such as pattern matching on the basis of an image captured by the rearview camera 15. The bending angle θs of the hitch connection bar 12 (i.e., bending angle θs of the towed object 11) around the connector 4 may be calculated, with an extension of the hitch arm 3a used as a reference line. It may be determined that the connector 4 is located at the center of the hitch connection bar 12 by the method such as pattern matching. Thus, the rearview camera 15 may serve as a specific example of a "bending angle detector" in one implementation of the technology.

It is also possible, for example, for the bending angle θs to be presumed from a difference between a left portion and a right portion in the horizontal width of a front of the towed object 11, other than the detection of the bending angle θs based on the image supplied from the rearview camera 15. The front of the towed object 11 covered by each of the scan regions 2La and 2Ra may be detected on the basis of the scan data supplied from the left rear side radar 2L and the right rear side radar 2R. In addition, it is also possible to presume the bending angle θs from a steering angle of the own vehicle 1 detected by a steering angle sensor. Alternatively, an angle sensor may be attached to the connector 4 to detect the bending angle θs. In this case, any of the left rear side radar 2L and the right rear side radar 2R, the steering angle sensor, and the angle sensor may serve as a specific example of a "bending angle detector" in one implementation of the technology.

Next, the flow may proceed to step S16, in which a direction of the stop determination threshold distance during towing Lt may be corrected on the basis of the bending angle θs. That is, when the bending angle θs is generated between the own vehicle 1 and the towed object 11 as illustrated in FIG. 7, the towed object 11 may oscillate in a horizontal direction around the connector 4. Therefore, when the distance from the own vehicle 1 to the connector 4 (hitch arm distance) is set as Lv, a distance (Lt—Lv) rotated by the bending angle θs may be the stop determination threshold distance during towing Lt after correction of the direction.

It is to be noted that, for easy description, FIG. 6A illustrates the stop guide virtual line Gs that is not actually generated, at a position, parallel to the rear end of the towed object 11, of one end of the stop determination threshold distance during towing Lt. One end of the stop determination threshold distance during towing Lt may be so set as to coincide with the stop guide virtual line Gs. The processing in each of steps S15 to S17 may correspond to a specific example of processing executed by a "stop determination threshold distance corrector" in one implementation of the technology.

Thereafter, the flow may proceed to step S17, in which, on the basis of a corrected stop determination threshold distance during towing Lt, a preset spacing distance (e.g., 0.5 m to 1.0 m) may be added to the stop determination threshold distance during towing Lt to set a proximity premonitory threshold distance Lt'. For easy description, FIG. 6A illustrates the premonitory guide virtual line Gn that is not actually generated, at a position where the one end of proximity premonitory threshold distance Lt' is set. One end of the proximity premonitory threshold distance Lt' may be so set as to coincide with the premonitory guide virtual line Gn. Accordingly, the premonitory guide virtual line Gn and the stop guide virtual line Gs may be parallel to each other.

Next, the flow may proceed to step S18, in which it may be checked whether there is the obstacle 17 behind the towed object 11 on the basis of the scan data supplied from the left rear side radar 2L and the right rear side radar 2R. Thereafter, when the obstacle 17 is detected, the flow may proceed to step S19. When the obstacle 17 is not detected, the flow may exit the routine.

Figure 6B:
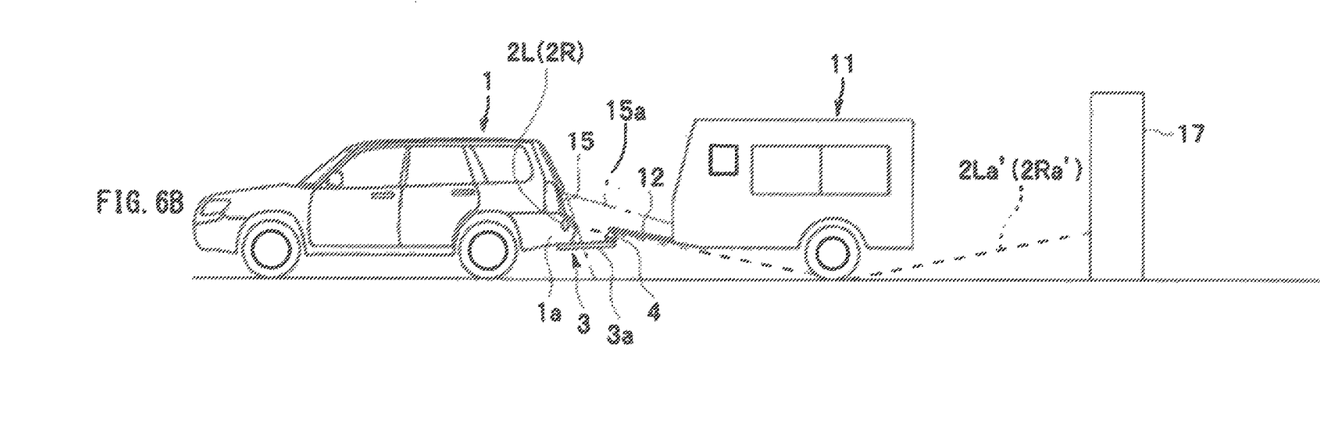
FIG. 6B is a side view of the state illustrated in FIG. 6A.

The obstacle 17 behind the towed object 11 may be detected on the basis of reflected waves received by the left rear side radar 2L and the right rear side radar 2R. That is, as illustrated in FIG. 6B, the radar radio waves 2La' and 2Ra' having been reflected rearward by the road surface below the towed object 11 are incident on the surface of the obstacle 17, and the left rear side radar 2L and the right rear side radar 2R may receive the reflected waves of the incident radar radio waves 2La' and 2Ra' to detect the obstacle 17.

When the flow proceeds to step S19 upon determination that there is the obstacle 17, a distance (obstacle distance) Lo from the rear end of the own vehicle 1 to the obstacle 17 may be calculated on the basis of arrival time of the reflected waves received by the left rear side radar 2L and the right rear side radar 2R. In this case, when the towed object 11 has the bending angle θs with respect to the own vehicle 1 during reversing as illustrated in FIG. 7, respective distances determined on the basis of the arrival times of the reflected waves received by the left rear side radar 2L and the right rear side radar 2R may be corrected to thereby calculate the obstacle distance Lo from the rear end of the own vehicle 1 to the obstacle 17 behind the towed object 11. The correction may be made on the basis of the distance Lv from the rear end of the own vehicle 1 to the connector 4 and on the bending angle θs. It is to be noted that the processing in this step S19 may correspond to a specific example of processing executed by an "obstacle distance detector" in one implementation of the technology.

Thereafter, in step S20, the obstacle distance Lo and the proximity premonitory threshold distance Lt' may be compared with each other. When it is determined that the obstacle distance Lo does not reach the proximity premonitory threshold distance Lt' (Lo>Lt'), the flow may exit the routine. In contrast, when it is determined that the obstacle distance Lo has reached the proximity premonitory threshold distance Lt' (Lo≤Lt'), the flow may proceed to step S21, in which a command signal that actuates a stop warning sound may be outputted to the alarm controller 32, and the flow may proceed to step S22.

Thereafter, the alarm controller 32 may actuate a warning unit such as a speaker, a buzzer, and a warning lamp to emit the stop warning sound, and may inform the driver to the effect that the own vehicle 1 is to be stopped because the rear end of the towed object 11 is brought into proximity to the obstacle 17. It is to be noted that examples of the stop warning sound emitted by the warning unit may include an intermittent whistling sound such as a repetitive beeping sound and a sound that is controlled to have shorter interval as the rear end of the towed object 11 is brought into proximity to one end of the stop determination threshold distance during towing Lt.

Thereafter, the flow may proceed to step S22, in which a brake pressure that reduces the vehicle speed Vs to 0 km/h when the stop determination threshold distance during towing Lt reaches the obstacle distance Lo may be operated on the basis of the vehicle speed Vs and a difference between the obstacle distance Lo and the stop determination threshold distance during towing Lt (Lo—Lt). Thereafter, a corresponding brake signal may be outputted to the automatic brake controller provided in the drive assistant controller 31 to actuate an automatic brake. It is to be noted that the processing in each of steps S20 to S22 may correspond to a specific example of processing executed by an "automatic brake controller" in one implementation of the technology.

Thereafter, the flow may proceed to step S23, in which the own vehicle speed Vs detected by the vehicle speed sensor 13 may be read, and it may be checked whether the own vehicle 1 is stopped by the actuation of the automatic brake controller. When the own vehicle 1 is not stopped (Vs>0), the flow may return to step S19. When the own vehicle 1 is stopped (Vs=0), the flow may proceed to step S24, in which a command signal that stops the stop warning sound may be outputted to the alarm controller 32 to stop the stop warning sound, and the flow may exit the routine.

As has been described, according to the implementation of the technology, when a driver, for example, causes the own vehicle 1 to travel after connecting the towed object 11 to the own vehicle 1, the scan data supplied from the left rear side radar 2L and the right rear side radar 2R may be read until the own vehicle speed Vs reaches the set vehicle speed Vo (or until the elapse of the set time To), and it may be checked whether there is an object that travels while keeping a substantially constant distance with respect to the own vehicle 1. Thereafter, when the traveling object is detected, it may be determined that the towed object 11 is connected to the own vehicle 1, and the stop determination threshold distance during towing Lt (stop guide virtual line Gs in FIG. 1B) may be set for securing a stop determination threshold distance with respect to the obstacle 17, behind the towed object 11. Therefore, it becomes possible to appropriately inform the driver to the effect that one end of the stop determination threshold distance during towing Lt reaches the obstacle 17 behind the towed object 11 in reversing the towed object 11 connected to the own vehicle 1 even when the towed object 11 is not provided with a sensor that detects the rear.

In addition, the bending angle θs between the own vehicle 1 and the towed object 11 in reversing the own vehicle 1 while towing the towed object 11 may be detected, and the stop determination threshold distance during towing Lt may be corrected on the basis of the bending angle θs to set one end of the corrected stop determination threshold distance during towing Lt behind the towed objet 11. Therefore, it becomes possible to constantly set one end of the stop determination threshold distance during towing Lt at a position parallel to the rear of the towed object 11 even when the bending angle θs is generated with steering operations in reversing the towed object 11.

Further, one end of the proximity premonitory threshold distance Lt' may be set behind one end of the stop determination threshold distance during towing Lt. When one end of the proximity premonitory threshold distance Lt' reaches the obstacle 17, the stop warning sound may be emitted and the automatic brake controller may be actuated. Therefore, it becomes possible for the driver to easily grasp a timing at which the towed object 11 is stopped, thus enabling achievement of high usability.

It is to be noted that the technology is not limited to the foregoing implementation. For example, the ON (Fm=1) and the OFF (Fm=0) of the towing mode may also be set by the driver, for example, with an operation of a manual switch in connecting the towed object 11 to the own vehicle 1. In this case, step S4 in FIG. 3 becomes unnecessary, and whether the manual switch is ON may be determined in step S5. The manual switch may serve as a specific example of a "towed object detector" in one implementation of the technology.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle reverse assistant comprising:
a rear side sensor provided at a rear portion of an own vehicle, the rear side sensor sensing a rear side sensing region;
a towed object detector that detects whether a towed object is connected to the rear portion of the own vehicle;
a stop determination threshold distance setter that sets one end of a stop determination threshold distance at a position spaced apart at a constant distance from a rear end of the towed object on a basis of a sensing signal supplied from the rear side sensor when the towed object detector detects connection of the towed object;
a bending angle detector that detects a bending angle of a connector between the own vehicle and the towed object; and
a stop determination threshold distance corrector that corrects the one end of the stop determination threshold distance set by the stop determination threshold distance setter to a position behind the towed object on a basis of the bending angle detected by the bending angle detector.

2. The vehicle reverse assistant according to claim 1, wherein
the towed object detector detects, on the basis of the sensing signal supplied from the rear side sensor, whether there is an object that follows the own vehicle while keeping a constant distance in traveling of the own vehicle during a period from start of the own vehicle until a speed of the own vehicle reaches a set vehicle speed or during a period when a time from the start of the own vehicle reaches a set time, and
the towed object detector determines, when the object that follows the own vehicle is detected, that the towed object is connected to the rear portion of the own vehicle.

3. The vehicle reverse assistant according to claim 1, further comprising:
a select position detector that detects a set position of a select lever;
an obstacle distance detector that detects a distance from a rear end of the own vehicle to an obstacle behind the towed object on a basis of a reflected wave that is propagated from behind the towed object and is received by the rear side sensor, by setting the rear side sensor at a towing mode when the select position detector determines that the select lever is set at a reverse range; and an automatic brake controller that compares the distance from the rear end of the own vehicle to the obstacle detected by the obstacle distance detector with the stop determination threshold distance set by the stop determination threshold distance setter, and stops the own vehicle from reversing when the distance from the rear end of the own vehicle to the obstacle reaches the stop determination threshold distance.

4. The vehicle reverse assistant according to claim 2, further comprising:

a select position detector that detects a set position of a select lever;

an obstacle distance detector that detects a distance from a rear end of the own vehicle to an obstacle behind the towed object on a basis of a reflected wave that is propagated from behind the towed object and is received by the rear side sensor, by setting the rear side sensor at a towing mode when the select position detector determines that the select lever is set at a reverse range; and an automatic brake controller that compares the distance from the rear end of the own vehicle to the obstacle detected by the obstacle distance detector with the stop determination threshold distance set by the stop determination threshold distance setter, and stops the own vehicle from reversing when the distance from the rear end of the own vehicle to the obstacle reaches the stop determination threshold distance.

5. The vehicle reverse assistant according to claim 1, wherein the own vehicle comprises a hitch member including a hitch ball, and the towed object comprises a hitch connection bar including a hitch coupler, and wherein the connector comprises the hitch ball and the hitch coupler.

6. The vehicle reverse assistant according to claim 1, wherein the rear side sensor comprises one of a millimeter wave radar, a microwave radar, and an infrared laser radar.

7. The vehicle reverse assistant according to claim 1, wherein the rear side sensing region comprises a scan region, a lower portion of the scan region in a vertical direction allowing a road surface immediately behind the own vehicle to be irradiated by a radar wave of the rear side sensor.

8. The vehicle reverse assistant according to claim 1, wherein the bending angle detector comprises a rearview camera formed at a rear portion of the own vehicle.

9. The vehicle reverse assistant according to claim 8, wherein the rearview camera captures an image of the rear portion of the own vehicle so as to include a rear end edge of a rear bumper of the own vehicle.

10. The vehicle reverse assistant according to claim 1, further comprising:

a reverse assistant controller which includes the stop determination threshold distance setter, the rear side sensor being coupled to the reverse assistant controller.

11. The vehicle reverse assistant according to claim 10, further comprising:

a drive assistant controller which is coupled to an output of the reverse assistant controller and performs collision avoidance control by control intervention irrespective of an intention of a driver of the own vehicle.

12. The vehicle reverse assistant according to claim 11, further comprising:

an alarm controller which is coupled to an output of the reverse assistant controller and actuates a warning unit to emit a warning sound to the driver.

13. The vehicle reverse assistant according to claim 12, wherein the reverse assistant controller further comprises a rear monitor that sets a stop guide virtual line and a premonitory guide virtual line based on the stop determination threshold distance.

14. The vehicle reverse assistant according to claim 13, wherein the stop guide virtual line is parallel to the rear end of the towed object, and the premonitory guide virtual line is spaced apart rearward at a predetermined distance from the stop guide virtual line, and wherein the warning unit generates the warning sound when the stop guide virtual line and the premonitory guide virtual line are brought into proximity to an obstacle behind the towed object.

15. The vehicle reverse assistant according to claim 1, wherein the towed object detector comprises a manual switch for setting a towing mode of the vehicle.

16. A vehicle reverse assisting system comprising:

a rear side sensor provided at a rear portion of a vehicle;

a towed object detector that detects a towed object connected to the vehicle;

a stop determination threshold distance setter that sets an end of a stop determination threshold distance at a position spaced apart at a constant distance from a rear end of the towed object based on a sensing signal supplied from the rear side sensor;

a bending angle detector that detects a bending angle of a connector between the vehicle and the towed object; and a stop determination threshold distance corrector that corrects the end of the stop determination threshold distance set by the stop determination threshold distance setter to a position behind the towed object based on the bending angle detected by the bending angle detector.

17. A vehicle reverse assistant comprising:

a controller including a processor and a memory storing a program executed by the processor, to perform:

detecting a towed object connected to a vehicle by a sensing signal from a rear side sensor that is provided at a rear portion of the vehicle;

setting an end of a stop determination threshold distance at a first position spaced apart at a constant distance from a rear end of the towed object based on the sensing signal;

detecting a bending angle of a connector between the vehicle and the towed object; and correcting the end of the stop determination threshold distance from the first position to a second position behind the towed object based on the bending angle.

* * * * *